UNITED STATES PATENT OFFICE.

PATRICK S. DEVLAN, OF JERSEY CITY, NEW JERSEY.

IMPROVED COMPOSITION FOR LINING JOURNAL-BOXES, &c.

Specification forming part of Letters Patent No. 49,509, dated August 22, 1865.

*To all whom it may concern:*

Be it known that I, PATRICK S. DEVLAN, of Jersey City, county of Hudson, and State of New Jersey, have invented a new Composition of Matter for the Lining of Journal-Boxes and other Rubbing-Surfaces, which composition is applicable to other purposes; and I do hereby declare that the following is a full, clear, and exact description thereof.

My said invention consists of a compound of lime, plumbago, silicate of soda or potassa, and a fibrous substance, whether vegetable, animal, or mineral.

The mode of preparing and applying the said compound which I have tried with success is as follows, viz: I take three parts, by weight, of slaked lime, the older the better, and work it in water to about the consistency of paste, and then thoroughly mix with it one part, by weight, of quick or unslaked lime; or, as an equivalent, I take four parts, by weight, of quick-lime and sprinkle it with one-third its weight of water. The lime thus sprinkled will fall in a fine white powder, and it must then be sifted, and after being sifted it must be mixed with one-fourth part, by weight, of water. With this preparation of lime I thoroughly incorporate an equal quantity, by weight, of plumbago (graphite) and an equal quantity, by weight, of vegetable substance, such as bran, crushed cotton-seed, or hulls of rice, paper-pulp, or asbestus, or other like or equivalent substances, and then add as much silicate of soda or potassa as will make the whole of the required consistency, either to about the consistency of putty, to be applied to the inside of journal-boxes or other surfaces exposed to wear as a mastic, or it may be made thinner and applied with a brush. If applied as a mastic to the inside of boxes or other rubbing-surface, it can be brought to the required form by pressure, and, however applied, it will soon become hard, and will present a surface better adapted to reduce the friction of rubbing-surfaces, and which will require less oil or other lubricating substances, and less liable to heat than any other known substance.

What I claim as my invention, and desire to secure by Letters Patent, is—

As a lining for journal-boxes and other rubbing-surfaces, the compound, substantially as herein described, consisting of prepared lime, plumbago, silicate of soda or potassa, and fibrous substance, whether vegetable, animal, or mineral, as described.

P. S. DEVLAN.

Witnesses:
   WM. H. BISHOP,
   A. DE LACY.